United States Patent [19]

Lace

[11] 4,074,157

[45] Feb. 14, 1978

[54] PERMANENT MAGNET A.C. SIGNAL GENERATOR

[75] Inventor: Melvin A. Lace, Prospect Heights, Ill.

[73] Assignee: Synchro-Start Products, Inc., Del.

[21] Appl. No.: 729,272

[22] Filed: Oct. 4, 1976

[51] Int. Cl.² ............................................. H02K 3/50
[52] U.S. Cl. ................................... 310/67 R; 310/43; 310/156; 310/257; 310/194
[58] Field of Search ................... 310/43, 67, 156, 257, 310/194, 263, 68, 71

[56] References Cited

U.S. PATENT DOCUMENTS

| 3,215,878 | 11/1965 | Woodward, Jr. | 310/263 X |
| 3,475,630 | 10/1969 | Heinzen et al. | 310/43 |
| 3,596,122 | 7/1971 | Stewart | 310/67 |
| 3,711,732 | 1/1973 | Gerber et al. | 310/43 X |
| 3,974,406 | 8/1976 | Wehde | 310/156 X |

Primary Examiner—Donovan F. Duggan

[57] ABSTRACT

A sub-fractional A.C. signal generator incorporating a stator assembly comprising a coil wound upon an annular bobbin of molded insulator material, a pair of annular magnetically premeable stator members having alignment apertures snap-fit onto integral bosses projecting from the bobbin, in concentric relation in a stator sub-assembly, the two stator members affording a multiplicity of individual pole pieces interleaved one-for-one around the outer periphery of the coil. The sub-assembly and an insulator barrier are press fit onto opposite ends of a cylindrical stator support member within which a sleeve bearing is mounted to provide a complete stator assembly. A drive shaft is journalled in the stator bearing and carries an annular permanent magnet which encompasses the stator members but is spaced therefrom by a uniform radial air gap. A housing affixed to the insulator barrier encompasses rotor and stator assemblies.

12 Claims, 8 Drawing Figures

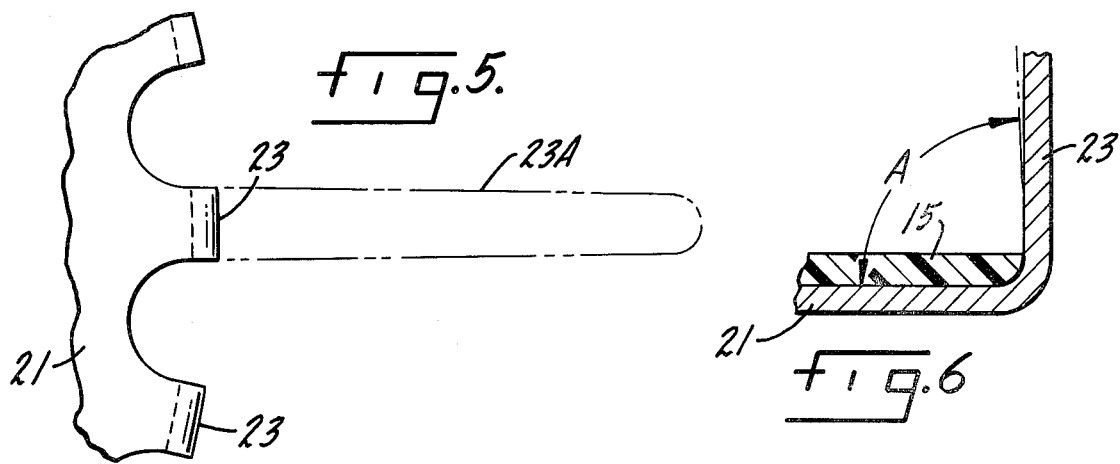
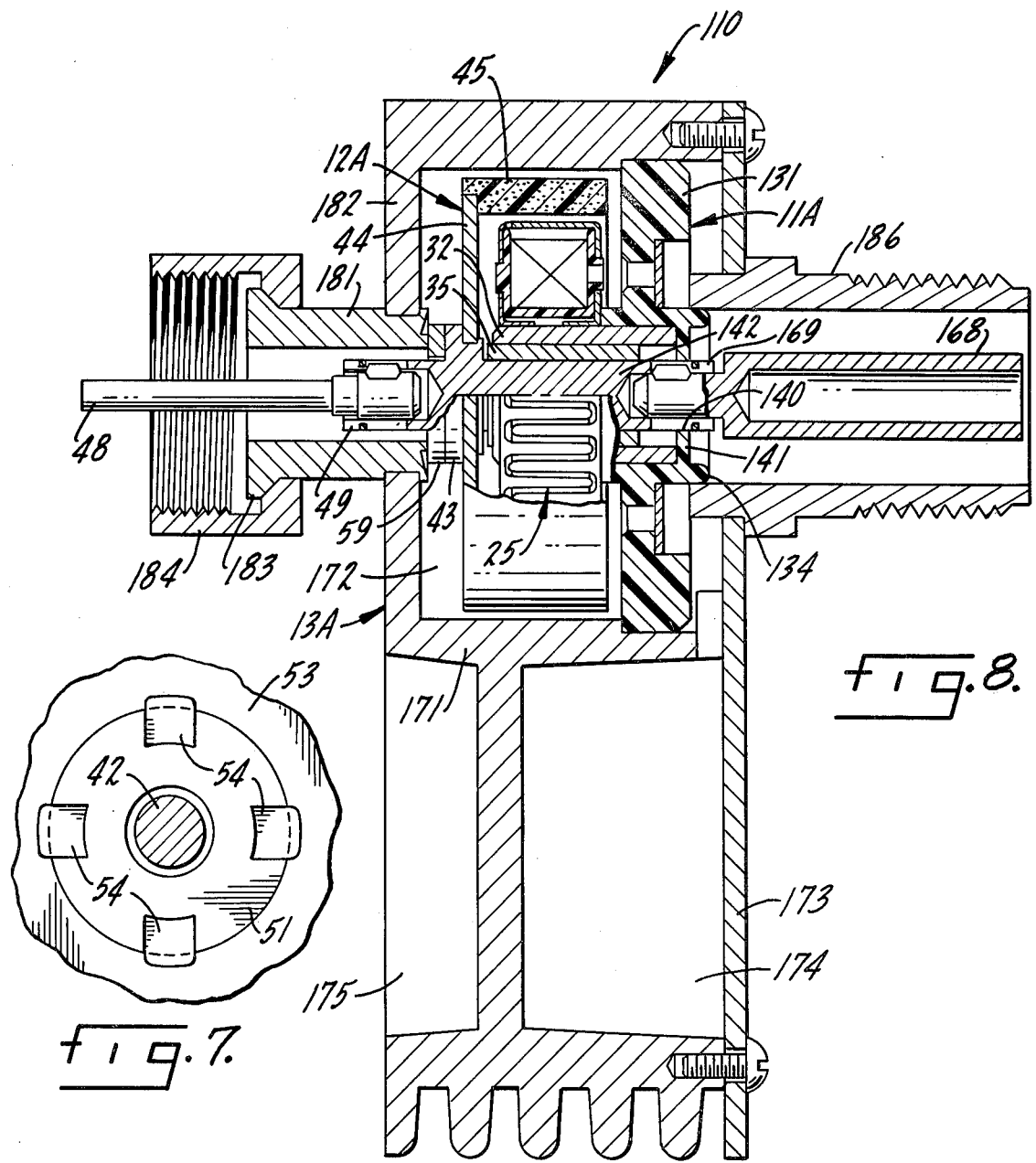

PERMANENT MAGNET A.C. SIGNAL GENERATOR

BACKGROUND OF THE INVENTION

There are numerous control applications in which a reliable electrical signal representative of the speed of a rotating shaft is essential. For example, in a bus or other passenger vehicle it may be desirable to provide an interlock to prevent opening of the doors whenever the vehicle is moving above a given speed. Similarly, in any vehicle it may be desirable to provide an interlock control to prevent shifting the transmission into reverse gear while the vehicle is moving in a forward direction at even a very low speed. There are also numerous industrial applications which require active or preventive control for one part of a machine whenever some other part of the machine is operating either above or below a particular critical speed.

To meet the needs of these various applications, a signal generator that provides a useful signal amplitude over a broad speed range is highly desirable. This presents substantial problems, particularly at relative low speeds. The signal generator must also afford a consistent relationship between some parameter of its signal output and the speed of the rotating member that it monitors. Thus, there should be a consistent relation between either the signal amplitude and the speed of the rotating member of between the signal frequency and the speed of the rotating member. Preferably, for maximum flexibility in various different applications, both the amplitude and the frequency of the output signal from the generator should be consistently related to the speed of the rotating shaft or other member being monitored, particularly at low speeds.

Sub-fractional permanent magnet signal generators have been employed in applications of the kind described above, but present substantial operating difficulties and cost problems. These devices are A.C. generators, and effective utilization of their output signals frequently requires a relatively consistent wave form. However, the wave form of the output signal is often subject to substantial variation due to lack of concentricity in the signal generator components. Furthermore, the same lack of concentricity may produce substantial variations in signal amplitude, at corresponding speeds, from unit to unit. These difficulties can be alleviated by adopting high precision manufacturing techniques and relatively expensive structures, but the resulting cost is frequently prohibitive, particularly for high volume applications in the automotive field.

In many applications, the speed signal generator is most conveniently used by being incorporated in an existing mechanism employed for other purposes. For example, in many automotive applications, where the speed of movement of the vehicle is the critical factor to be monitored, it is most convenient to connect the signal generator to the flexible rotating cable that drives the speedometer. In an application of this kind, the signal generator should provide for rapid and convenient connection to the speedometer cable, either at the transmission end or at the speedometer end, and should allow the speedometer drive cable to extend through the signal generator to maintain its original use.

In other applications, there may be two critical speeds for the same rotating member. Again referring to the automotive field, it may be desirable to provide for locking vehicles doors above one critical speed and to lock out the transmission from a shift into reverse at a substantially lower critical speed. To meet the needs of applications of this kind, the signal generators should be capable of being stacked in series with each other.

SUMMARY OF THE INVENTION

It is the principal object of the invention, therefore, to provide a new and improved sub-fractional permanent magnet A.C. signal generator that inherently maintains a consistent concentric relation between its stator and rotor elements without requiring undue precision or complexity in the component parts of the signal generator.

Another object of the invention is to provide a new and improved sub-fractional A.C. signal generator of the permanent magnet type that is simple and inexpensive in construction, yet affords a consistent relationship between the amplitude and frequency of the generator output and the speed of rotation of the generator shaft.

A further object of the invention is to provide a construction for a sub-fractional permanent magnet A.C. signal generator that permits the generator to be readily and conveniently connected in an existing drive connection, such as the speedometer cable for an automotive vehicle, at virtually any location along the drive connection.

A specific object of the invention is to provide a sub-fractional permanent magnet A.C. signal generator construction that permits complete and effective testing of both the rotor and the stator of the generator before they are assembled together.

Accordingly, the invention relates to a sub-fractional A.C. signal generator comprising an annular coil support of insulator material of U-shaped cross-sectional configuration having a plurality of integral alignment bosses on each side wall, an electrical coil wound upon the coil support, and a pair of annular magnetically permeable stator members of C-shaped cross-sectional configuration, each stator member having a plurality of alignment apertures fitted onto the alignment bosses on one side wall of the coil support to afford a stator sub-assembly, each stator member having a multiplicity of individual pole pieces interleaved one-for-one with the pole pieces of the other stator member around the outer periphery of the stator sub-assembly. The signal generator further comprises an insulator barrier member, and a cylindrical stator support having a sleeve bearing mounted co-axially therein, the insulator barrier and the stator sub-assembly being mounted on opposite ends of the stator support to afford a stator assembly. The generator also comprises a drive shaft, a cylindrical permanent magnet magnetized to afford a multiplicity of magnetic poles, corresponding to the total number of pole pieces on the stator members, facing a central axial opening having a diameter slightly larger than the outer diameter of the stator members, and magnet mounting means mounting one end of the magnet onto the shaft for rotation therewith, to afford a rotor assembly. The rotor assembly and the stator assembly are joined in a generator by sliding the two assemblies together with the rotor shaft journalled in the stator bearing and the magnet encompassing the stator members but spaced therefrom by a small, uniform radial air gap. A non-magnetic housing encompasses both assemblies and maintains the two assemblies in axial alignment.

BRIEF DESCRIPTION OF THE DRAWINGS

FIGS. 5 and 6 are detail views, on an enlarged scale, showing the pole pieces for one stator member in the generator of FIG. 1;

FIG. 7 is a sectional view taken approximately along line 7—7 in FIG. 1; and

FIG. 8 is a sectional view of a sub-fractional A.C. signal generator constructed in accordance with another embodiment of the present invention.

DESCRIPTION OF THE PREFERRED EMBODIMENTS

Figure 1:
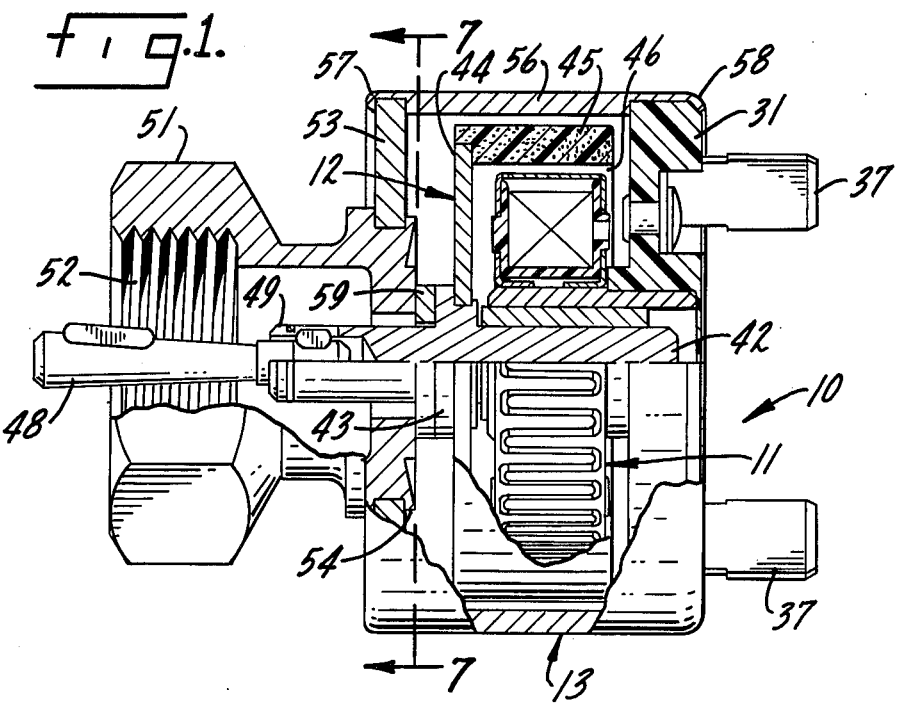
FIG. 1 is a partially sectional elevation view of a sub-fractional permanent magnet A.C. signal generator constructed in accordance with one embodiment of the present invention.

FIG. 1 affords a partially sectional elevation view of a sub-fractional A.C. signal generator 10 constructed in accordance with one embodiment of the present invention. Generator 10 comprises three separate assemblies, a stator assembly 11, a rotor assembly 12, and a housing assembly 13.

Figure 2:
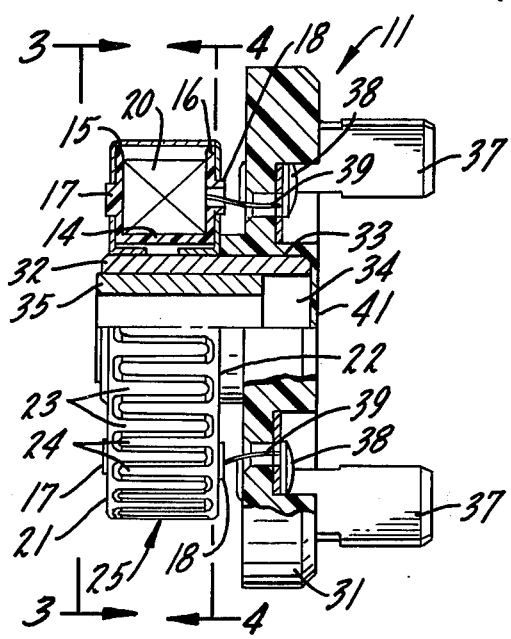
FIG. 2 is a partially sectional elevation view of the stator assembly for the generator of FIG. 1.

Stator assembly 11 is shown in detail in FIGS. 2-6. Referring to FIG. 2, it is seen that stator assembly 11 includes an annual coil support or bobbin 14, preferably of molded insulator material. One particular material that is satisfactory for bobbin 14 is nylon 6/6, 30 percent glass filled. One side wall 15 of coil support 14 is provided with two integral alignment projections or bosses 17 (See FIG. 3). The opposite side wall 16 of bobbin 14 has two similar integral alignment projections 18; however, each of the bosses 18 has a central aperture that extends completely through side wall 16. A slot 19 in bobbin wall 16 connects the periphery of the bobbin wall to the central aperture in one of the alignment projections 18. An electrical coil 20 is wound upon coil support 14 in the space between walls 15 and 16.

Figure 3:
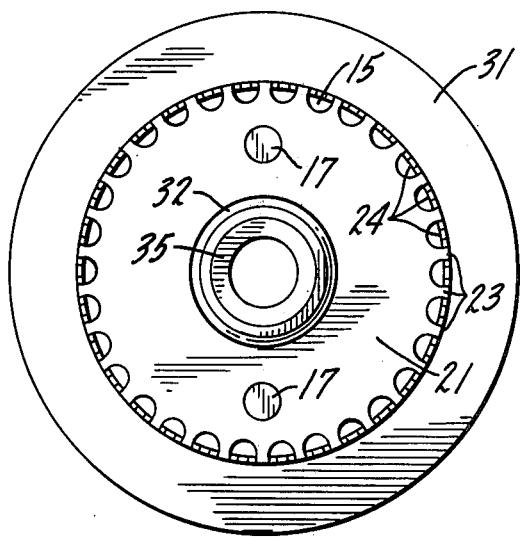
FIG. 3 is a detail view taken approximately as indicated by line 3—3 in FIG. 2.
Figure 4:
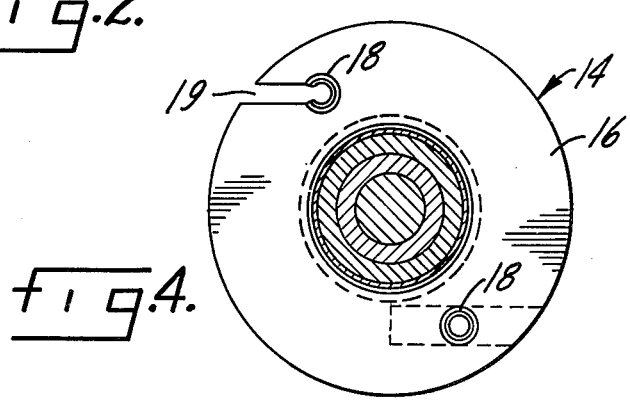
FIG. 4 is a detail sectional view taken approximately along line 4—4 in FIG. 2.

Stator assembly 11 further comprises a pair of annular magnetically permeable stator members 21 and 22, each of the two stator members being of C-shaped cross-sectional configuration. Stator member 21 has two alignment apertures which are fitted onto the bosses 17 on wall 15 of coil support 14, as shown in FIGS. 1, 2, and 3. The other stator member 22 has two alignment apertures that are fitted onto the alignment bosses 18 on the other bobbin wall 16. Preferably, the configuration of the bosses 17 and 18 is such that the relatively thin metal stator members 21 and 22 fit onto the bosses in a snap-fit, affording a compact and coherent stator sub-assembly 25.

The outer rim portion of stator member 21 is formed with a multiplicity of elongated pole pieces 23 as shown in FIGS. 2, 3, 5, and 6. Initially, the pole pieces 23 are formed co-planar with the main wall of stator member 21, as indicated by the pole piece outlined 23A in FIG. 5, and are then bent to an angle A (FIG. 6) slightly smaller than 90°. When stator member 21 is mounted upon wall 15 of coil support 14, the end of the coil support wall forces the pole pieces 23 slightly outwardly to the position shown in solid lines in FIG. 6, at an angle of 90°.

Similarly, stator member 22 includes a multiplicity of magnetic teeth or pole pieces 24 which extend at an angle of 90° to the main wall of the stator member. In the stator sub-assembly 25, the pole pieces 23 and 24 of stator members 21 and 23, respectively, are interleaved one-for-one with each other, as shown in FIGS. 1, 2, and 3. The total number of pole pieces 23 and 24 should be made as large as possible consistent with the use of practical manufacturing techniques. In generator 10, there are a total of sixty pole pieces. The total number of pole pieces can be varied to some extent, but as large a number as reasonably possible should be used.

Stator assembly 11, FIG. 2, further comprises an insulator barrier member 31. The insulator barrier 31 is preferably of molded resin material; one practical material for this member of the generator is the resin Lexan 3414, 30 percent glass filled. The insulator barrier member 31 has a cavity 34 into which a cylindrical stator support 32 is press fit. Preferably, the end portion 33 of support 32 is knurled to assure a firm, nonrotatable mounting of the insulator barrier on the support. A sleeve bearing 35 is press fit into sleeve 32. Sleeve 35 is preferably a self-lubricating bronze bearing, one practical material for this bearing being Oilite AA-304-1.

Two electrical terminals 37 are mounted on the insulator barrier member 31 by suitable means such as rivets 38. The electrical leads 39 for coil 20, brought out through the apertures in coil support bosses 18, are extended through apertures in insulator barrier 31 and electrically connected to terminals 37.

In fabricating stator assembly 11, the electrical coil 20 is first wound on coil support 14. The two stator members 21 and 22 are then fitted onto the bosses 17 and 18 on coil support 14 to complete the stator sub-assembly 25. Sleeve bearing 35 is press fit into the cylindrical stator support 32, and support 32 is then press fit into the cavity 34 in insulator barrier member 31, upon which terminals 37 have previously been mounted. The axial alignment of support member 32 and barrier 31 is determined by abutment of one end of the support member against the end wall 41 of the barrier cavity 34. Sub-assembly 25 is then pressed onto the opposite end of support 32 to complete stator assembly 11.

Referring to FIG. 1, it is seen that rotor assembly 12 comprises a drive shaft 42 formed with a medial shoulder 43. A metal disc or washer 44 is staked or otherwise securely mounted on shaft 42 adjacent shoulder 43. Washer 44 affords a mounting means for mounting one end of a cylindrical permanent magnet 45 to drive shaft 42 for rotation therewith. The preferred material for permanent magnet 45 is nylon filled with barium ferrite, sintered for dimensional and environmental stability. The permanent magnet 45 is magnetized to afford a multiplicity of magnetic poles, corresponding to the total number of pole pieces 23 and 24 on the stator members 21 and 22, facing toward the axial open 46 in the magnet. Thus, in generator 10 magnet 45 provides a total of sixty magnetic poles. As is apparent in FIG. 1, the axial opening 46 in permanent magnet 45 has a diameter slightly larger than the outer diameter of stator members 21 and 22.

One end of shaft 22, the left-hand end as seen in FIG. 1, is provided with drive coupling means for connecting generator 10 to an external shaft or other rotating member. In generator 10, the drive connection comprises a drive tang 48 fitted into a socket 49 in the left-hand end of drive shaft 42. However, other convenient connection means may be employed as desired.

The housing assembly 13 of generator 10 comprises a mounting nut 51 having a threaded opening 52 at one end. The other end of nut 51 is firmly staked or otherwise affixed to a washer-shaped end wall member 53. In the preferred arrangement, as shown in FIG. 7, the end wall member 53 is staked to nut 51 at four places, as indicated by reference number 54. Housing assembly 13 further comprises a cylindrical housing member 56 having two thin end flanges 57 and 58. Flange 57 is crimped around the rim of the end wall member 53. Flange 58 is crimped around the outer rim of insulator barrier member 31.

As noted above, stator assembly 11 (FIG. 2) is fabricated as a complete unit prior to incorporation in generator 10. This makes it possible to perform complete tests on the stator by inserting the stator assembly into a test jig that includes a rotable permanent magnet corresponding to magnet 45. Appropriate testing can then be carried out to be certain that the electrical output from the stator assembly, when immersed in a rotating magnetic field, will afford a consistent frequency and amplitude response with respect to speed. Similarly, rotor assembly 12 can be tested with a stator assembly having known acceptable characteristics prior to incorporation of the rotor assembly in a generator.

Final assembly of generator 10 is both simple and expedient. Rotor assembly 12 and stator assembly 11 are brought together, the right-hand portion of drive shaft 42 being inserted into sleeve bearing 35. The combined stator and rotor assemblies are then inserted into housing assembly 13 along with a self-lubricating bronze thrust bearing 59. The flange 58 on housing cylinder 56 is then crimped over the outer rim of the insulator barrier 31, completing the assembly of generator 10. All of the operating elements of the generator are effectively centered by direct engagement with the cylindrical support member 32 or through the accurate alignment with the support member afforded by sleeve bearing 35. Consequently, any departure from the essential concentricity of the operating elements for the generator is effectively minimized and, for the most part, eliminated.

FIG. 8 illustrates a sub-fractional A.C. signal generator 110 constructed in accordance with another embodiment of the present invention. Generator 110 comprises a stator assembly 11A that is generally similar to the stator assembly 11 of generator 10 (FIG. 1) except for some limited changes in the insulator barrier. Thus, stator assembly 11A includes a stator sub-assembly 25 having the same construction as described above and mounted upon one end of a cylindrical stator support 32 within which a self-lubricating sleeve bearing 35 is mounted. An insulator barrier member 131 is mounted on the other end of stator support 32. In this instance, however, the end wall 141 of the insulator barrier is provided with an axial aperture 140. Furthermore, an annular alignment ridge 134 is molded integrally with barrier member 131, being located in concentric encompassing relation to the aperture 140 in wall 141.

Rotor assembly 12A is also generally similar to the rotor assembly of the previously described embodiment. It comprises a cylindrical permanent magnet 45 mounted on the rim of a mounting washer 44 that is staked or otherwise securely fasten to a drive shaft 142 at a shoulder 43. The end of drive shaft 142 extending outwardly from shoulder 43 is again provided with a socket 49 into which a drive tang 48 is fitted. The opposite end of drive shaft 142, however, adjacent insulator barrier 131, is formed with a socket 169 into which a second drive tang 168 is fitted. Thus, shaft 142 can be driven from either end and affords an output drive connection at the other end.

Housing assembly 13A includes a cast aluminum or other metal body 171 affording a first chamber 172 within which stator assembly 11A and rotor assembly 12A are mounted. One end of chamber 172 is open to permit ready insertion of the rotor and stator assemblies into the housing. The open end is closed by a cover 173 that also closes the open face of a second chamber 174. Chamber 174 may be utilized to house the logic circuits for an interlock or other control device actuated by the output signal from generator 110. Housing 13A may also afford a separate chamber 175 for the output stage of the control logic enclosed within chamber 174, providing some heat isolation for the other logic elements. That is, by fabricating housing body 172 from a good heat conductor, such as aluminum, that body can afford a heat sink for the electronic circuits and the generator, particularly the output stage.

Protection for the drive tang 48 at one end of rotor shaft 142 is provided by a sleeve 181 affixed to the front wall 182 of housing 13A. A flange 183 on sleeve 181 serves to retain a free rotating nut 184 on the sleeve, nut 184 providing a connection to a cable housing or the like. On the other side of housing 13A, adjacent cover 173, a mounting hub 186 is affixed to the annular aligning ridge 134 of barrier member 131; hub 186 protects the drive tang 168. Hub 186 may be provided with an external thread for engaging the nut 184 of a second similar generator (not shown).

The signal generators 10 and 110 each incorporate a construction which effectively and inherently maintains the operating elements of the generator, rotor and stator, in accurate concentric alignment. In each device, the stator assembly and the rotor assembly can be thoroughly tested independently of each other prior to being mounted together in a generator housing. The large number of magnet poles incorporated in the generator aids materially in affording an output signal that has a consistent amplitude and frequency relation with respect to speed, and is particularly advantageous for low speed applications. There is no need to utilize extremely precise tolerances in the manufacture of either generator, and manufacturing and assembly are both simple and economical.

I claim:

1. The sub-fractional A.C. signal generator comprising:
    an annular coil support of insulator material of U-shaped cross-sectional configuration having a plurality of integral alignment bosses on each side wall;
    an electrical coil wound upon the coil support;
    a pair of annular, magnetically permeable stator members of C-shaped cross-sectional configuration, each stator member having a plurality of alignment apertures fitted onto the alignment bosses on one side wall of the coil support to afford a stator sub-assembly, each stator member having a multiplicity of individual pole pieces interleaved one-for-one with the pole pieces of the other stator member around the outer periphery of the stator sub-assembly;
    an insulator barrier member;
    a cylindrical stator support having a sleeve bearing mounted co-axially therein;

the insulator barrier and the stator sub-assembly being mounted on opposite ends of the stator support to afford a stator assembly;

a drive shaft;

a cylindrical permanent magnet magnetized to afford a multiplicity of magnetic poles, corresponding to the total number of pole pieces on the stator members, facing a central axial opening having a diameter slightly larger than the outer diameter of the stator members;

magnet mounting means mounting one end of the magnet onto the shaft for rotation therewith, to afford a rotor assembly;

the rotor assembly and stator assembly being joined in a generator by sliding the two assemblies together with the rotor shaft journalled in the stator bearing and the magnet encompassing the stator members but spaced therefrom by a small, uniform radial air gap; and a housing encompassing both assemblies and maintaining the two assemblies in axial alignment.

2. A sub-fractional A.C. signal generator according to claim 1, in which at least one of the alignment bosses on the coil support includes an aperture through which an electrical lead extends from the coil to an external terminal.

3. A sub-fractional A.C. signal generator according to claim 1, in which two aligning projections on the side of the coil support nearest the insulator barrier are provided with apertures through which electrical leads extend from the coil to external terminal members mounted on the insulator barrier.

4. A sub-fractional A.C. signal generator according to claim 1, in which the stator support is press fit into a cavity in the insulator barrier member and the two stator members are press fit onto the stator support, the stator support being formed of magnetically permeable material and constituting a magnetic circuit element interconnecting the two stator members.

5. A sub-fractional A.C. signal generator according to claim 1, in which, prior to completion of the stator assembly, the pole pieces of each stator member extend at an angle of slightly less than 90° relative to the sides of the stator members, and in which the pole pieces of each stator member are deflected to and held at an angle of 90° to the side of the stator member by engagement with the edge of one side wall of the coil support.

6. A sub-fractional A.C. signal generator according to claim 1, in which the insulator barrier member includes an aperture co-axially aligned with the shaft, and in which each end of the shaft includes drive connection means for connection to an external rotating member.

7. A sub-fractional A.C. signal generator according to claim 1, in which the housing comprises a metal casting affording a cup-shaped generator compartment within which the stator assembly and rotor assembly are mounted, the insulator barrier extending across the open end of the generator compartment, and a separate logic control compartment for housing a logic control circuit energized from the signal generator, the metal casting affording a common heat sink for the signal generator and the logic control circuit.

8. A sub-fractional A.C. signal generator according to claim 7, in which the insulator barrier includes an aperture co-axially aligned with the shaft, and in which each end of the shaft includes drive connection means for connection to an external rotating member.

9. A sub-fractional A.C. signal generator according to claim 8, in which the insulator barrier further comprises an integral mounting ridge projecting outwardly of the barrier in concentric encompassing relation to the shaft aperture, and a mounting hub, affixed to the barrier mounting ridge in co-axial alignment with the shaft, for connecting the generator to a housing for an external shaft.

10. A sub-fractional A.C. signal generator according to claim 9 and further comprising a mounting sleeve affixed to the side of the housing opposite the insulator barrier, in co-axial encompassing relation to the generator shaft, and a freely rotatable nut mounted on the mounting sleeve for connection to a housing for an external shaft.

11. A sub-fractional A.C. signal generator according to claim 1, in which the housing includes a mounting nut projecting from the side of the housing opposite the insulator barrier member for connecting the generator housing to a housing for an external shaft.

12. A sub-fractional A.C. signal generator according to claim 1 having sixty magnetic pole pieces and sixty permanent magnet poles.

* * * * *